Figure 1:
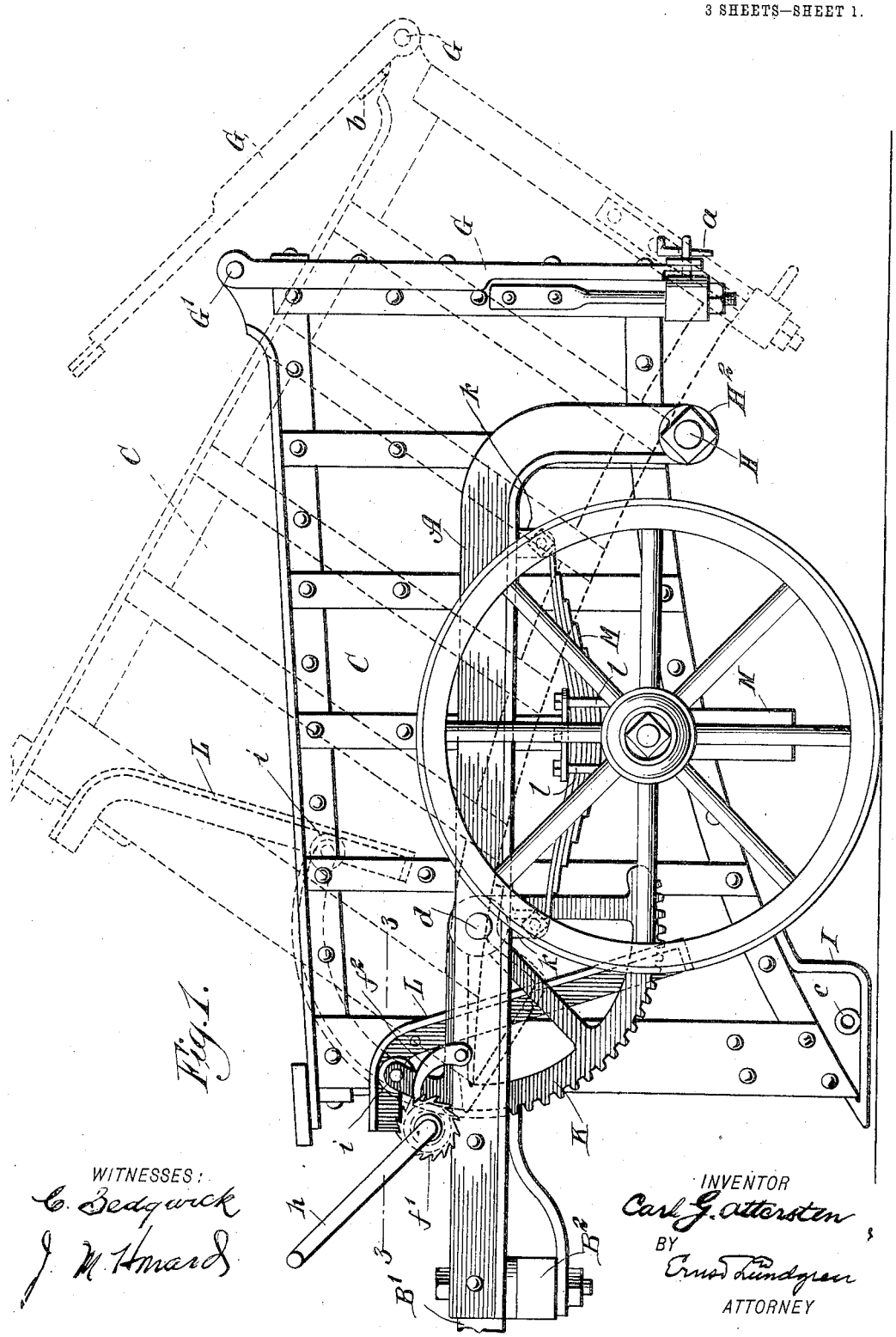

No. 827,657. PATENTED JULY 31, 1906.
C. G. OTTERSTEN.
SNOW LOADING AND DUMPING CART.
APPLICATION FILED DEC. 4, 1905.

3 SHEETS—SHEET 1.

WITNESSES:
C. Sedgwick
J. M. Hmard

INVENTOR
Carl G. Ottersten
BY
Ernst Lundgren
ATTORNEY

No. 827,657. PATENTED JULY 31, 1906.
C. G. OTTERSTEN.
SNOW LOADING AND DUMPING CART.
APPLICATION FILED DEC. 4, 1905.

3 SHEETS—SHEET 2.

WITNESSES:

INVENTOR

BY

ATTORNEY

No. 827,657. PATENTED JULY 31, 1906.
C. G. OTTERSTEN.
SNOW LOADING AND DUMPING CART.
APPLICATION FILED DEC. 4, 1905.
3 SHEETS—SHEET 3.
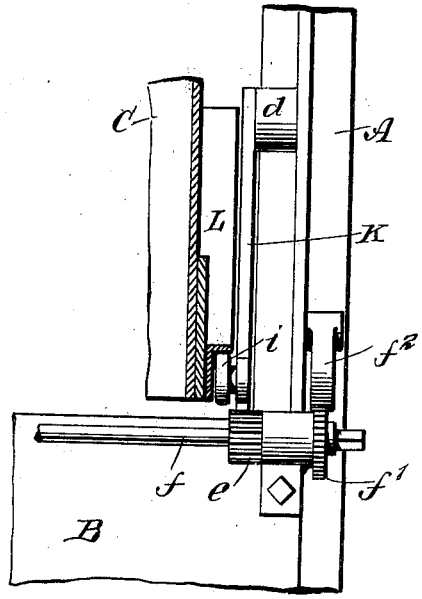
Fig. 3.
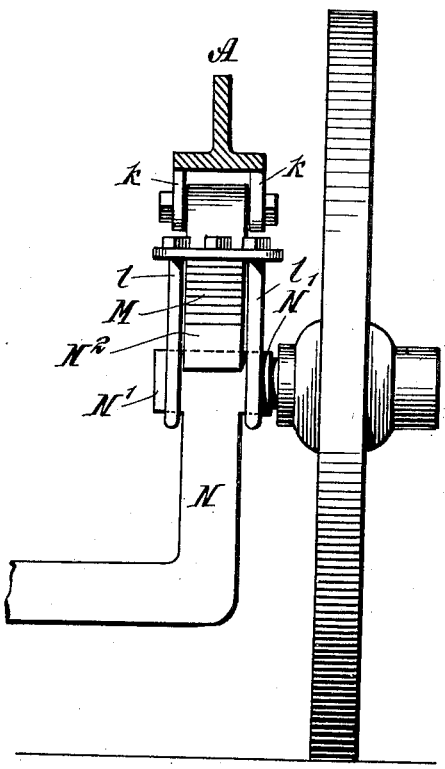
Fig. 4.
Fig. 5.
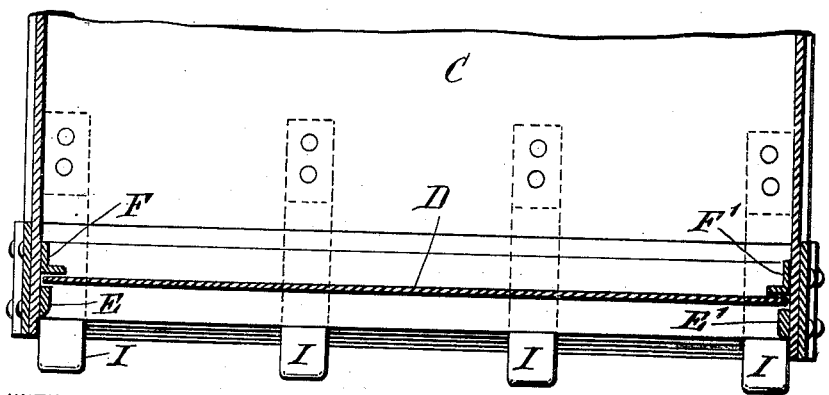
WITNESSES:
C. Sedgwick
J. M. Howard
INVENTOR
Carl G. Ottersten
BY
Ernst Lundgren
ATTORNEY
THE NORRIS PETERS CO., WASHINGTON, D. C.

UNITED STATES PATENT OFFICE.

CARL G. OTTERSTEN, OF NEW YORK, N. Y.

SNOW LOADING AND DUMPING CART.

No. 827,657.

Specification of Letters Patent.

Patented July 31, 1906.

Application filed December 4, 1905. Serial No. 290,091.

*To all whom it may concern:*

Be it known that I, CARL G. OTTERSTEN, a citizen of the United States, residing in the borough of Brooklyn, city of New York, in the county of Kings and State of New York, have invented certain new and useful Improvements in Snow Loading and Dumping Carts, of which the following is a full, clear, and exact specification, reference being had to the accompanying drawings and to the reference characters marked thereon.

The object of this invention is to provide or produce a cart or vehicle more especially adapted for the loading and dumping of snow, which cart shall be amply strong and durable, of few and simple parts, easy to be operated, and which will be capable of self-loading as well as self-dumping, whereby snow may be economically and quickly gathered and carted away, especially from city streets and thoroughfares, without the necessity of stopping the cart in the street, as in the case of carts or wagons which require to be loaded by hand.

To accomplish all of the foregoing objects and to secure other and further advantages in the matters of manufacture or construction, operation, and use, my improvements involve certain new and useful arrangements or combinations of parts, peculiarities of construction, and principles of operation, as will be herein first fully described and then pointed out in the claims.

While my improved cart is chiefly designed for use in gathering and removing snow from city streets, it will be apparent that it may be adopted for use in gathering and removing or dumping other materials or in any situation where its advantages may be utilized.

Figure 2:
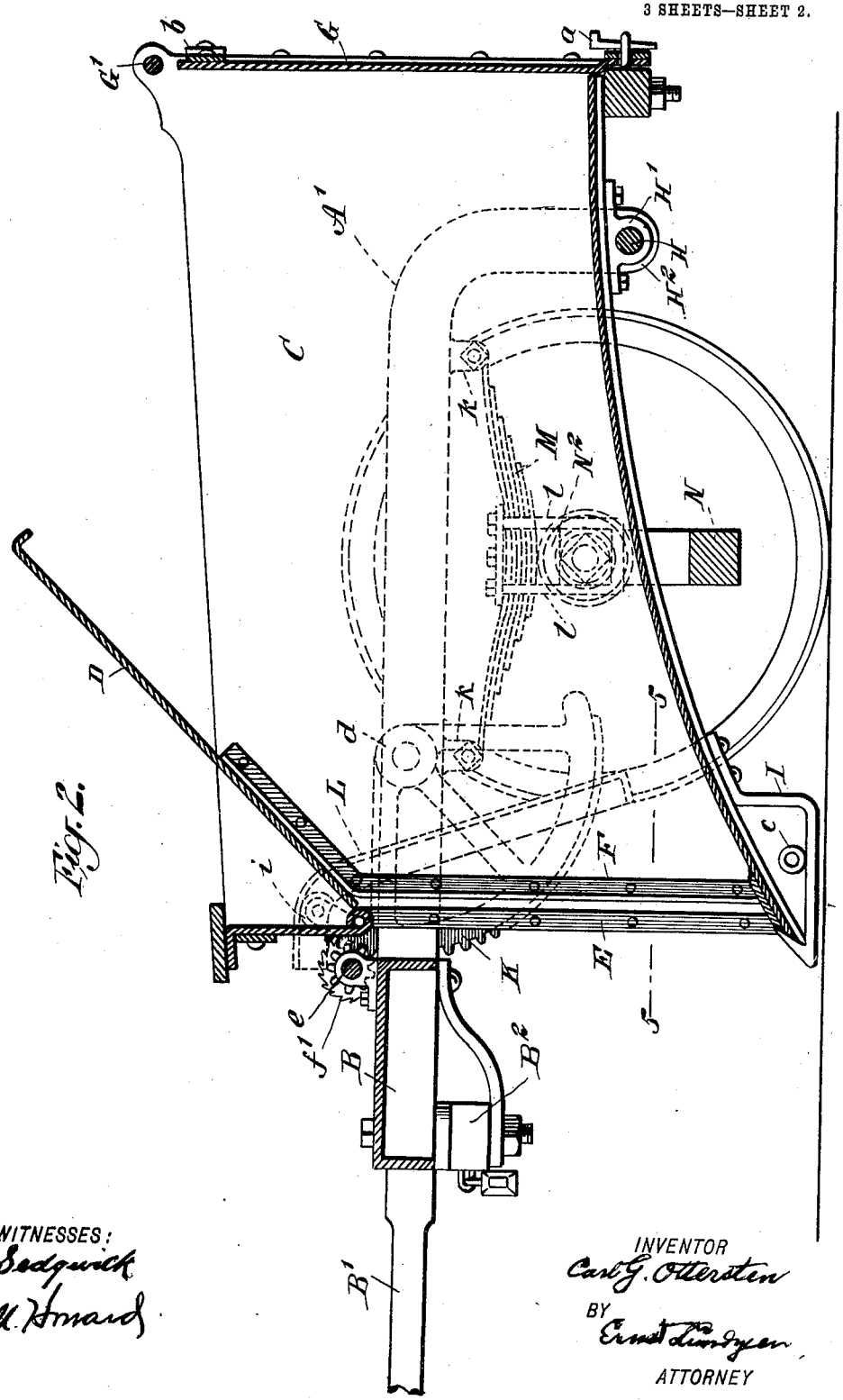

In the accompanying drawings, forming part of this specification, Figure 1 is a side elevation of my improved cart or vehicle, showing the front of the box lowered as when desired to take the load, the dumping position of the box being shown in dotted lines. Fig. 2 is a section and elevation on a plane passing longitudinally through the box, the front of the latter being shown in depressed position and the front plate or board shown as elevated, so as to open the front of the box to permit the snow or other material to pass in. Fig. 3 is a top or plan view and partial section of a fragment, showing the construction and arrangement of means for elevating and depressing the front of the box and locking it in any position. Fig. 4 is a front elevation and partial section of a fragment, showing the construction and arrangement of the axle, the manner of holding the spring thereon, and the manner of connecting the box-supporting frame with the axle through the medium of the spring. Fig. 5 is a horizontal section and plan view of the front portion of the box, the view being taken on a plane through line 5 5 of Fig. 2, but showing the front plate or board in position to close the front of the box.

In all the figures like reference characters, wherever they are employed, indicate corresponding parts.

A and A' are two similar side pieces of the frame which supports the box and which in turn is supported by the axle of the cart. These parts, as are, in fact, all the other parts, are made abundantly strong and durable to withstand the severe uses to which they will be subjected. These particular pieces are preferably made of T-iron, and they are bent down at the rear ends and supplied with suitable fittings to receive the hinge-rod which connects the box with the supporting-frame and allows the former to be moved or tipped within the frame, and it is also supplied with fittings at proper points for the purpose of mounting it upon the means by which it is connected with the axle of the cart.

At the front of the cart the side frame-pieces are connected by any suitable cross-piece, as B, on which the shaft or shafts is or are connected and the whiffletree secured. The cross-piece B affords a convenient foot-board for the driver.

B' represents a pole or shaft, which may be connected with the cross-piece B by any suitable means. A single pole is used when two draft-animals are employed, and in such case the weight upon the pole is usually transmitted to the collars of the harness on the animals, as will be readily understood; but two poles or shafts may be used, as when one draft-animal is employed or as when three are employed, and then the weight on the pole is preferably transmitted to the saddles of the harness, as is easily understood and not necessary to be graphically illustrated herein.

$B^2$ represents any convenient form of whiffletree to be utilized for the ordinary purposes of such devices.

C represents the vehicle-box, the same being preferably made up of metal plates properly riveted together, although it might be made partly of wood and partly of metal, the marginal portions being especially strengthened or stiffened. The front portion of the box is considerably deeper than the rear portion, and the bottom is preferably inclined by a gradual curve from front to rear in order the better to facilitate the loading; but this particular shape is not material. The front of the box has an opening extending from side to side and nearly to the top, this opening being arranged to be closed by a metal plate, as D, which is arranged to slide up and down between guides E E' and F F'. The pieces F and F' are made of L-shaped iron and firmly secured to the box and bent back at their upper portions, as indicated in Fig. 2, so as there to supply a support or rest for the plate D when the latter is elevated, in which position it is shown in Fig. 2. In order to close the front of the box, it is only necessary to raise the plate to an upright position and permit it to descend in the guides provided for it or to crowd it down to place against the material which may obstruct the front opening in the box.

The rear of the box is provided with a hinged door G, the same being hinged at the upper part, as on a bolt G', and being arranged to be keyed fast at the lower part when closed, as by a removable key or keys $a$, entering suitable staples connected with the body of the box. The upper margin of the box being made of angle-iron, as indicated, is slightly cut away near the hinge and the door provided with a cross-piece $b$ for abutting against the upper margin of the box when the door is turned up, as indicated in the dotted lines in Fig. 1. It will be noted that the door when in this opened position extends above the top of the box, the purpose of this being that when it is intended to dump the load a man can, if desirable, enter the box to shovel out whatever portion of the contents may be necessary, he then having ample room to stand beneath the door without inconvenience. The box is hinged upon the lower ends of the frame, as upon a hinge-rod H, the same being secured to the bottom of the body in a substantial manner, as by blocks H', passing through fittings $H^2$ on the ends of the frame-pieces and secured in place by suitable nuts or by other proper means. The hinge-rod H must sustain a portion of the weight of the load and must withstand the strains of the loading operation, and it is made amply strong for these purposes.

I I are shoes applied upon the front portion of the box-bottom and intended for contact with the roadway when the box is being loaded to prevent undue wear on the front edge of the bottom. Suitable eyes, as at $c$, may be conveniently applied in the shoes I at the sides of the box to facilitate attachment of a chain or other means which it may sometimes be desired to use to assist in drawing the box into a bank of snow or other material when the latter is unusually hard; but ordinarily it will not be necessary to employ this extra force in loading.

The front of the box is raised or lowered by mechanical means. In the form shown this means consists of a toothed arc or segment K, one on each side, pivoted, as at $d$, and actutated by an engaging pinion $e$, mounted upon a shaft $f$, fitted to receive a removable hand-crank $h$. The shaft $f$ is also supplied with a ratchet-wheel $f'$, and a pawl, as $f^2$, is arranged to hold the ratchet-wheel at any desired point or to release it, as may be required.

The upper end of the arc or segment K is supplied with a friction-roller $i$, which contacts with an inclined angle-piece L, bolted to the side of the box. When the arc or segment is raised by suitably turning the crank $h$, the roller $i$ presses against the projecting portion of the angle-piece L, and thereby crowds the latter up, the box then turning upon the hinge-bolt H, as represented in Fig. 1.

When it is desired to load the box, the plate D is raised and the front of the box lowered, so that its bottom edge contacts with the pavement or ground, as in Fig. 2. Then the cart is moved forward through the snow or material to be gathered and the box thus automatically loaded, after which the front is raised sufficiently to permit easy traveling and the front plate D closed. To dump the box, the front may be raised to any desired height after the door G has been swung open. Ordinarily the load will be discharged by its own gravity, the front of the box being further elevated by hand, if so desired. Lugs, as $k$ $k$, serve for connecting the frame A with a suitable form of spring M, which may be employed.

The axle of the vehicle is represented at N, and it is made in one piece, extending across below the bottom of the box, thence up on each side, being provided with fittings for receiving the wheels, projections on each side, as at N' N', to receive the yokes $l$ $l$, by which the spring is secured in place, and a seat $N^2$ for said spring.

The cart being constructed and arranged substantially in accordance with the foregoing explanations will be found to admirably answer all the purposes or objects of the invention hereinbefore alluded to. It may be easily and quickly loaded, employing the power of the draft-animals for that purpose. It may be easily and quickly dumped, and it affords a capacious vehicle for carting away the material. A notable advantage of the use of the improved cart in city streets for removing snow is that it may move along with other vehicles, take its load without stopping, and move off with the load, in no way interfering with or impeding the usual traffic, which is an important consideration independent of the economy in the matter of loading.

Having now fully described my invention, what I claim as new herein, and desire to secure by Letters Patent, is—

1. In a vehicle of the character herein set forth, the combination with a box having an opening at front and rear, of two side frame-pieces mounted upon or in connection with the vehicle-axle, said pieces being connected at front by a cross-piece and being bent down at the rear, and a hinge-bolt for connecting the box with the frame-pieces, substantially as and for the purposes set forth.

2. In a vehicle of the character herein set forth, the combination with the box having an opening at front and rear, of a sliding plate arranged to close the front opening substantially as shown and described.

3. The combination with the vehicle-box having the opening in front, of the sliding plate and the guide-pieces for said plate secured upon the box, the inner guide-pieces being bent back at their upper parts to afford a support for the sliding plate when the latter is elevated, substantially as and for the purposes set forth.

4. The combination with the box, of the hinged door arranged to close the opening at the rear of the box, said door being provided with a cross-piece and arranged to bear upon the upper side margins of the box when the hinged door is opened, substantially as and for the purposes set forth.

5. In a vehicle of the character herein set forth, the combination with the box having a front opening and a plate for closing the same and being hinged as explained, of shoes applied upon the front of the bottom of the box, substantially as shown and described.

6. In combination with the hinged box having an opening at front and rear as explained and means for closing said openings, of shoes applied upon the front margin of the bottom of the box and eyes located in the outside shoes, substantially as and for the purposes set forth 7. The combination with the hinged box having an opening at front and rear as explained and mounted between side frame-pieces, of a hinged toothed arc or segment, means for mechanically moving the same, and an inclined piece applied on the side of the box to receive the thrust of the arc or segment, substantially as and for the purposes set forth.

8. The combination of the hinged box, the side frame-pieces, the toothed arc or segment, means for mechanically moving the latter, an inclined piece applied on the side of the box, and a roller mounted in the end of the arc for contacting with the inclined piece, substantially as and for the purposes set forth.

9. In a vehicle of the character herein set forth, the combination with the frame and the box hinged in connection therewith, of the axle for receiving the wheels, said axle being made in a single piece extending beneath the bottom of the box and provided with a seat for the spring and projections for receiving the yokes by which the spring is secured in connection with the axle, substantially as and for the purposes set forth.

10. In combination, a vehicle-box having an opening at each end, a sliding plate for closing the front opening, a hinged door for closing the rear opening, side frame-pieces connected with the axle, a hinge-rod connecting the frame-pieces and the box, means for mechanically raising and lowering the front of the box, and means for connecting the shaft or shafts and whiffletree with the side frame, the parts being constructed and arranged substantially as and for the purposes set forth.

In testimony whereof I have signed my name to this specification in the presence of two subscribing witnesses.

CARL G. OTTERSTEN.

Witnesses:
  C. SEDGWICK,
  J. M. HOWARD.